United States Patent [19]
Skinner et al.

[11] 3,837,658
[45] Sept. 24, 1974

[54] ROTARY STEAM SEAL FOR DRYER DRUM

[75] Inventors: Eugene S. Skinner, Roscoe; Elmer E. Crist; Louis D. Phelps, both of Beloit, all of Wis.

[73] Assignee: Beloit Corporation, Beloit, Wis.

[22] Filed: Jan. 5, 1973

[21] Appl. No.: 321,328

[52] U.S. Cl.................. 277/26, 277/85, 279/93, 285/272
[51] Int. Cl............................................. F16j 15/38
[58] Field of Search............ 277/85, 91, 81, 93, 26; 285/134, 281, 279, 272, 87

[56] References Cited
UNITED STATES PATENTS

| | | | |
|---|---|---|---|
| 1,769,905 | 7/1930 | Berry | 285/134 |
| 1,892,781 | 1/1933 | Hoenstine | 285/137 |
| 2,805,086 | 9/1957 | Shumaker | 285/134 |
| 2,836,439 | 5/1958 | Moore | 285/134 |
| 3,508,767 | 4/1970 | Crist et al. | 277/85 |
| 3,765,689 | 10/1973 | Adams | 277/81 R |

*Primary Examiner*—Louis R. Prince
*Assistant Examiner*—John W. Sheppard
*Attorney, Agent, or Firm*—Hill, Gross, Simpson, Van Santen, Steadman, Chiara & Simpson

[57] ABSTRACT

A rotary union including first and second relatively rotating units, the second unit being stationary and the first unit including a carbonaceous sealing ring having a radial sealing face and a rearwardly facing beveled centering face, a rotatable holding member having a beveled holding face in engagement with said centering face and a secondary O-ring seal behind the centering face, the stationary unit including a second sealing ring urged against the first sealing ring by a coiled compression spring and supported in a holding member with axial sliding pins preventing rotation of the second sealing member relative to the holdering member and an O-ring between the holding member and second sealing ring accommodating axial movement thereof.

11 Claims, 2 Drawing Figures

PATENTED SEP 24 1974　　　　　　　　　3,837,658

ROTARY STEAM SEAL FOR DRYER DRUM

BACKGROUND OF THE INVENTION

The invention relates to improvements in rotary seals for connecting relatively rotating pipes or conduits with the seals being of the type commonly known in the industry as a "rotary union."

In the connection of relatively rotating pipes difficulties are encountered which are not present in conventional seals such as the type where a rotating shaft passes through a frame or enclosure, or seals of the type which retain lubricant or exclude foreign materials in bearings. Rotary union types of seals must frequently operate in an environment wherein a wide range of pressures is encountered and/or a wide range of temperatures and materials is encountered. With changes in the temperatures the difference in thermal expansion rates cause a relative shifting of parts and could cause leakage in many convention seals. Also conventional seals frequently are capable of operating only within a small pressure range or are adapted solely for certain types of materials. Further with a wide range of fluids to be conducted a lubricating medium is not always present and in certain temperatures can not be provided.

It is accordingly an object of the present invention to provide an improved rotary union type seal which does not require the provision of lubricant and which is capable of conducting a wide range of fluids from gases to liquids.

More particularly a seal such as provided by the present invention can be used in an environment where the pressure range might be from a vacuum of 20 inches of mercury to a positive pressure of 300 p.s.i. or even higher. When conducting water through the seal a temperature range may be from just above freezing at 32° F. on upwardly with mixtures of water and steam to steam in the superheated condition at temperatures on the order of 1,000° F. If other liquids or gases were being passed through the seal, wide temperature ranges might also be expected. This provides a contrast to seals which operate under uniform conditions and which are provided for the isolation of dirt, oil, noise and so forth and which operate at small temperature and pressure ranges.

An environment where a seal of the instant type is useful is in a paper making machine dryer drum wherein a conduit leads into the axial end of the drum for conducting superheated steam into the drum and another conduit is used for the removal of condensed steam.

A feature of the present invention is the provision of a rotary union type of seal which uses a carbonaceous seal material that can operate over long periods of operation without requiring additional lubricant and can rubbingly seal against another material without scoring and cutting. This type of material is commercially available at a reasonable cost but offers disadvantages. It is relatively weak in tension, and is relatively brittle, particularly in tension, and has a rate of expansion and contraction with varying temperatures which is quite different from any commercial metal that may be used for retaining adjacent parts of the seal. It does have the facility that it is relatively strong in compression.

It is accordingly another object of the invention to provide an improved rotary union type of seal which utilizes carbonaceous seal material utilizing its attractive features and solving the problems caused by its disadvantageous features.

Other objects, advantages and features will become more apparent, as will equivalent structures which are intended to be covered hereby, in connection with the teaching of the principles of the invention with the disclosure of the preferred embodiments in the specification, claims and drawings, in which:

Figure 1:
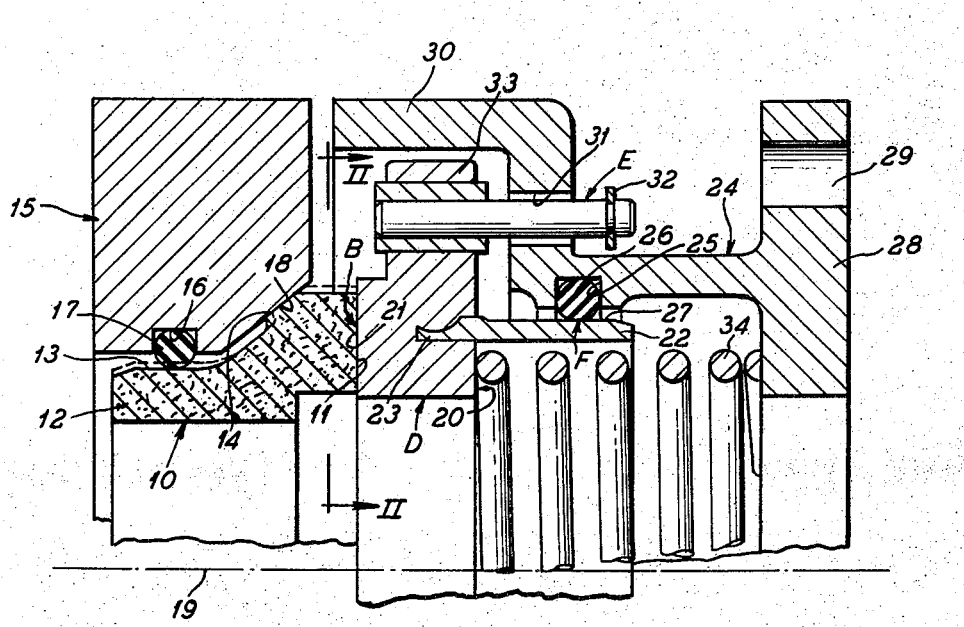
FIG. 1 is a partial vertical sectional view taken through the axis of a seal constructed and operating in accordance with the present invention.

As shown in FIG. 1, the rotary union or seal assembly includes first and second units. In the preferred arrangement the first unit rotates and includes a first sealing ring 10 and a holding member 15. It will be understood, however, that in an alternate arrangement, the sealing ring 10 could be nonrotatable and be backed by a spring so that it would be urged axially toward the other member. That is, in such a construction the ring 20 would be supported by the holding member 15 and rotate therewith. The carbon ring 10 would be held nonrotatable and would be urged axially by the spring 34. This first unit attaches to a rotating drum.

The second unit, which attaches to a supply to the drum, includes a second stationary sealing ring 20 with body member 24 which supports the stationary sealing ring 20.

In a dryer for a paper machine, the first unit including the sealing ring 10 and holding member 15 will attach to a rotating steam dryer drum and the second unit will be attached to the supply piping to supply steam to the dryer drum.

The first sealing ring 10 has a substantially radial annular sealing face 11. The ring is formed of a carbonaceous material of the type known to the sealing industry and as such has a different thermal expansion than metal parts. Nonmetallic materials other than carbon may be used. To center the sealing ring 10 and accommodate the differences in annular expansion, the ring has a centering face 14 which faces rearwardly, away from the sealing face 11. The centering face is at an angle in the range of 20° to 70° and preferably on the order of 30° permitting the face 14 to slide against an angularly inwardly facing holding face 18 of a holding member 15. The faces 14 and 18 are smooth and conform to each other so that the sealing relationship will continue with relative sliding movement in a radial direction.

In addition to the faces 14 and 18 sealing with respect to each other they provide a centering function holding the sealing ring 10 in a centered location relative to the axial center 19 of rotation of the unit. The unit is hollow so that fluid is conducted through the center along the axis 19.

An additional requirement of the centering face 14 is that it be of a greater frictional force than the sealing face 11. This will effectively encourage rotation between the sealing face 11 and a mating sealing face 21, and prevent relative rotation between the centering face 14 and its mating holding face 18. Since the frictional forces are a function of the forces normal to the surfaces as well as to the total surface area, the centering face 14 is made with sufficiently larger frictional force than the sealing face 11 so as to prevent rotation of the sealing ring 10 relative to its holding ring 15, and the relative rotational sealing face will occur at 11.

The sealing ring is provided with a secondary seal rearwardly of its sealing face 11. This is accomplished by an annular flange 12 extending rearwardly from the holding ring with the flange having a smooth annular outer surface 13 against which seats an O-ring 17. The O-ring is carried in an annular groove 16 in the holding member. The annular O-ring 17 loosely engages the annular surface 13 so that the sealing ring in effect floats within the holding ring carried in its position due to the axial force applied between the sealing faces 11 and 21, which axial force is provided by a coil compression spring 34 as will later be described.

Figure 2:
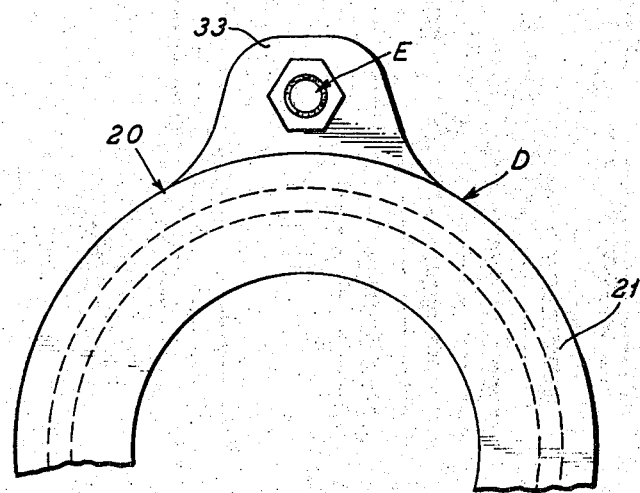
FIG. 2 is an end elevational view of one of the members of the seal, taken substantially along the line II—II of FIG. 1.

As shown in FIGS. 1 and 2, the second or stationary unit of the rotary union includes the second sealing ring 20 which has it smooth annular radial sealing face 21. The ring 20 is preferably of a cast very hard iron which can be lapped to the smoothness required.

A forwardly extending annular flange 22 is attached to the second sealing ring 20. The flange is manufactured separately and is cast into the ring 20 at 23. The sealing ring 20 should have a very hard surface to contact the carbon ring 10. This surface should have a fine dense grain structure which will accept a flat sealing surface 21.

The second sealing ring unit should have a corrosion resistant surface for sealing it relative to the body member 24. For this purpose the flange 22 is preferably of a material such as stainless steel and has a smooth outer annular surface 27 sealingly engaged by an O-ring 26 seated in a flange 25 in the holding member. The requirements of the sealing ring unit can best be accomplished by making it in two pieces, that is the flange 22 is formed of a stainless steel tubing cast into the cast iron ring 20. It will be understood that the ring 20 and the flange 22 could be made in one piece. The ring 20 can be formed of a cast nickel alloy iron having a hardness in the range of 550 Brinell. The unit provides a hard wearing surface for the mating carbon seal ring and provides a stainless steel surface which is easily machined and polished for contact with the O-ring 26. The ring 20 is preferably so hard that it is not suitable for ordinary methods of machining and therefore it is impractical to attach the flange 22 by means other than by casting.

The body member is provided with a base flange 28 drilled at locations such as 29 for mounting it on a rigid support. The base flange provides a base for seating the coil compression spring 34 which urges the sealing faces together.

Rotation of the sealing ring 20 relative to the body member is prevented by pins 32. These pins are shrunk fit into bushings in openings in ears 33 on the ring 20 and the pins extend in a forward direction loosely through openings 31 in the body member. Said body member has a rearwardly extending axial flange which surrounds the second sealing ring 20 and protects the sealing faces 11 and 21.

Attempts have also been made to attach the carbon ring to a holding ring with an adhesive or cement in a leak-proof manner but adhesives have been found to be unsatisfactory for withstanding the environmental conditions encountered.

With the tapered seal shown, if the holding surface of the metal contracts, it places the carbon in compression and inasmuch as the ring has substantial strength in compression it can withstand this relationship. If the outer holding ring expands the carbon ring is under axial pressure and is free to move further into the conical supporting surface 18 and the holding force and sealing relationship is maintained. Inasmuch as a broad surface 18 is provided, a very good leak-proof seal is accomplished. The primary seal of the O-ring prevents leakage between the surfaces 14 and 18. The O-ring 17 is sufficiently loose to allow axial movement to permit the carbon ring to always maintain its intimate contact at the surface 18.

It is desirable to maintain an accurately controlled pressure between the rotating sealing surfaces 11 and 21. Too little pressure will permit leakage and too much pressure will cause increased wear of the surfaces. This is controlled by the proper selection of spring 34.

The sealing ring 20 is prevented from rotating within the body member preferably by the pins 32 as shown, but other pins or keys could be used to prevent this rotation. The holding means must accommodate axial travel so that as the carbon ring wears, axial movement of the second ring 20 continues the seal.

The use of the conical supporting and centering surface 18 has the advantage that it locates and supports the carbon sealing ring and it is firm without being rigid. It is possible under unusual conditions to develop a "stick-slip" type of torsional vibration on the face having relative motion. If the carbon ring were held rigidly as with devices heretofore available, this vibration can fatigue and crack the carbon. The present firm but not rigid support of the carbon by the conical supporting surface reduces this hazard.

We claim as our invention:

1. A rotary union comprising in combination:
   first and second relatively rotating units;
   said first unit including,
      a sealing ring having an axially forwardly facing annular smooth substantially radial sealing face and having a centering face which faces axially rearwardly and radially outwardly at an angle;
      a holding member having an axially forwardly inwardly facing holding face in sealing engagement with said centering face accommodating relative circumferential expansion of said sealing ring and axial shifting due to said expansion while maintaining said sealing engagement with said sealing ring being substantially non-rotational relative to the holding member;
      a secondary seal positioned between said holding member and said sealing ring rearwardly of said holding face;
   said second unit including,
      a second sealing ring having a smooth substantially radial annular sealing face in sliding engagement with the sealing face of the sealing ring;
   and means for urging said first unit and said sealing ring axially together for holding said radial sealing faces in sliding sealing relationship.

2. A rotary union constructed in accordance with claim 1: wherein said holding member is metal and said first sealing ring is a carbonaceous material having a different rate of thermal expansion than the holding member.

3. A rotary union constructed in accordance with claim 1:

including a rearwardly extending annular flange on the first sealing ring;

and said secondary seal comprising an annular O-ring surrounding the annular flange and sealingly positioned between the flange and said holding member.

4. A rotary union constructed in accordance with claim 1:

including a forwardly extending annular flange on the second sealing ring;

and said urging means including an annular spring within said flange on said second ring urging the second ring toward the first ring.

5. A rotary union constructed in accordance with claim 1:

including an annular forwardly extending flange on the second sealing ring wherein said second sealing ring is formed of a cast hard iron and said flange is formed of stainless steel tubing cast into the ring.

6. A rotary union constructed in accordance with claim 1:

including an annular body member for supporting said second sealing ring with an annular seal between the body member and second sealing ring.

7. A rotary union constructed in accordance with claim 1:

including an annular body member for supporting said second sealing ring with an O-ring seal between the body member and the sealing ring accommodating relative axial movement therebetween and including means for preventing rotation of the second sealing ring relative to the body member.

8. A rotary union constructed in accordance with claim 7, wherein said rotation-preventing means includes axially extending pins projecting through openings accommodating relative axial movement between the second sealing ring and body member and preventing relative rotation therebetween.

9. A rotary union constructed in accordance with claim 1:

wherein said centering face and holding face are at an angle of between 20° and 70°.

10. A rotary union constructed in accordance with claim 1:

wherein said secondary seal included between said holding member and the first sealing ring rearwardly of the holding face is in the form of a compliant annular ring.

11. A rotary union comprising in combination:

first and second relative rotating units;

said first unit including, a sealing ring having an axially forwardly facing annular smooth radial sealing face and a axially rearwardly and outwardly facing centering face extending at an angle to the axis of the ring;

a holding member having an axially forwardly and inwardly facing holding face in sealing engagement with said centering face accommodating relative circumferential expansion of said sealing ring with axial shifting due to said expansion while maintaining said sealing engagement, a annularly rearwardly extending flange on the sealing ring;

an annular O-ring having a groove in the holding ring and in sealing axially sliding engagement with said flange;

said second unit including, a second sealing ring formed of hard cast iron and having a smooth radial annular rearwardly facing sealing face in sliding engagement with the sealing face of the first sealing ring;

an annular flange extending forwardly and cast into the second sealing ring, a coiled compression spring within the annular flange urging the second sealing ring toward the first sealing ring;

an annular holding member surrounding the second sealing ring;

an O-ring between the holding member and the annular flange of the second sealing ring;

axially extending pins on the holding ring;

means defining openings in the holding ring receiving said pins accommodating relative axial movement of the second sealing ring and preventing rotational movement thereof;

and means for mounting said holding ring on a stationary support.

* * * * *